(12) United States Patent
Wendte et al.

(10) Patent No.: US 8,827,001 B2
(45) Date of Patent: Sep. 9, 2014

(54) SOIL MONITORING SYSTEM

(75) Inventors: Keith W. Wendte, Willowbrook, IL (US); Brian T. Adams, Centralia, MO (US)

(73) Assignee: CNH Industrial America LLC, New Holland, PA (US)

( * ) Notice: Subject to any disclaimer, the term of this patent is extended or adjusted under 35 U.S.C. 154(b) by 116 days.

(21) Appl. No.: 13/352,001

(22) Filed: Jan. 17, 2012

(65) Prior Publication Data

US 2013/0180742 A1    Jul. 18, 2013

(51) Int. Cl.
*A01B 63/111* (2006.01)

(52) U.S. Cl.
USPC .................................. 172/4; 33/625

(58) Field of Classification Search
CPC ............... A01B 63/008; A01B 63/111; A01B 63/1115; A01B 63/1145; A01B 63/145; E02D 1/022
USPC ......... 172/4, 763, 773, 701, 140, 468; 33/625
See application file for complete search history.

(56) References Cited

U.S. PATENT DOCUMENTS

| | | | | |
|---|---|---|---|---|
| 1,911,349 A | * | 5/1933 | Byrd | 172/692 |
| 3,058,243 A | | 10/1962 | McGee | |
| 3,136,371 A | * | 6/1964 | Rau et al. | 172/4 |
| 4,044,838 A | * | 8/1977 | Wooldridge | 172/2 |
| 4,171,021 A | * | 10/1979 | van der Lely | 172/48 |
| 4,248,310 A | | 2/1981 | McWilliams | |
| 4,444,271 A | * | 4/1984 | Dietrich, Sr. | 172/140 |
| 4,600,060 A | * | 7/1986 | Winter et al. | 172/4 |
| 5,033,031 A | * | 7/1991 | Bohman | 367/96 |
| 5,524,560 A | * | 6/1996 | Carter | 111/200 |
| 6,041,582 A | | 3/2000 | Tiede et al. | |
| 6,061,618 A | | 5/2000 | Hale et al. | |

(Continued)

FOREIGN PATENT DOCUMENTS

| | | |
|---|---|---|
| DE | 102010000218 | 7/2011 |
| WO | 03023396 | 3/2003 |
| WO | 2007085462 | 8/2007 |

OTHER PUBLICATIONS

Adamchuk et al., "Comparison of Two Alternative Methods to Map Soil Mechanical Resistance On-the-Go," American Society of Agricultural and Biological Engineers Annual International Meeting, Jul. 9-12, 2006, pp. 1-11, Paper No. 061057, Portland, OR.

(Continued)

*Primary Examiner* — Thomas B Will
*Assistant Examiner* — Joel F. Mitchell
(74) *Attorney, Agent, or Firm* — Rebecca L. Henkel

(57) ABSTRACT

A soil monitoring system is provided that includes a sensing shank, and a first sensor coupled to a leading edge of the sensing shank. The first sensor is configured to output first signals indicative of a pressure exerted on the first sensor by soil as the sensing shank is driven through the soil along a direction of travel. The soil monitoring system also includes a frame forming a channel oriented in a substantially vertical direction relative to a surface of the soil, and a carrier coupled to the sensing shank and disposed within the channel. The soil monitoring system further includes an actuator extending between the frame and the carrier. The actuator is configured to linearly drive the carrier in a reciprocating motion to vary a penetration depth of the sensing shank within the soil.

15 Claims, 6 Drawing Sheets

(56) References Cited

U.S. PATENT DOCUMENTS

| | | |
|---|---|---|
| 6,062,090 A | 5/2000 | Bachhuber et al. |
| 6,119,069 A | 9/2000 | McCauley |
| 6,389,999 B1 | 5/2002 | Duello |
| 6,497,153 B1 | 12/2002 | Hoskinson et al. |
| 6,647,799 B1 | 11/2003 | Raper et al. |
| 6,701,857 B1 | 3/2004 | Jensen et al. |
| 6,834,550 B2 | 12/2004 | Upadhyaya et al. |
| 6,853,937 B2 | 2/2005 | Shibusawa et al. |
| 7,028,554 B2 | 4/2006 | Adamchuk et al. |
| 7,104,340 B1 | 9/2006 | Thompson et al. |
| 7,254,485 B2 | 8/2007 | Rooney et al. |
| 7,317,988 B2 | 1/2008 | Johnson |
| 7,428,455 B2 | 9/2008 | Corcoran |
| 2007/0239338 A1 | 10/2007 | Potts et al. |

OTHER PUBLICATIONS

Chung et al., "Design and Validation of an On-The-Go Soil Strength Profile Sensor," American Society of Agricultural and Biological Engineers, 2006, vol. 49(1), pp. 5-14.

PCT International Search Report and Written Opinion dated Nov. 21, 2013.

PCT Invitation to Pay Additional Fees and Where Applicable Protest Fee mailed Jul. 8, 2013.

* cited by examiner

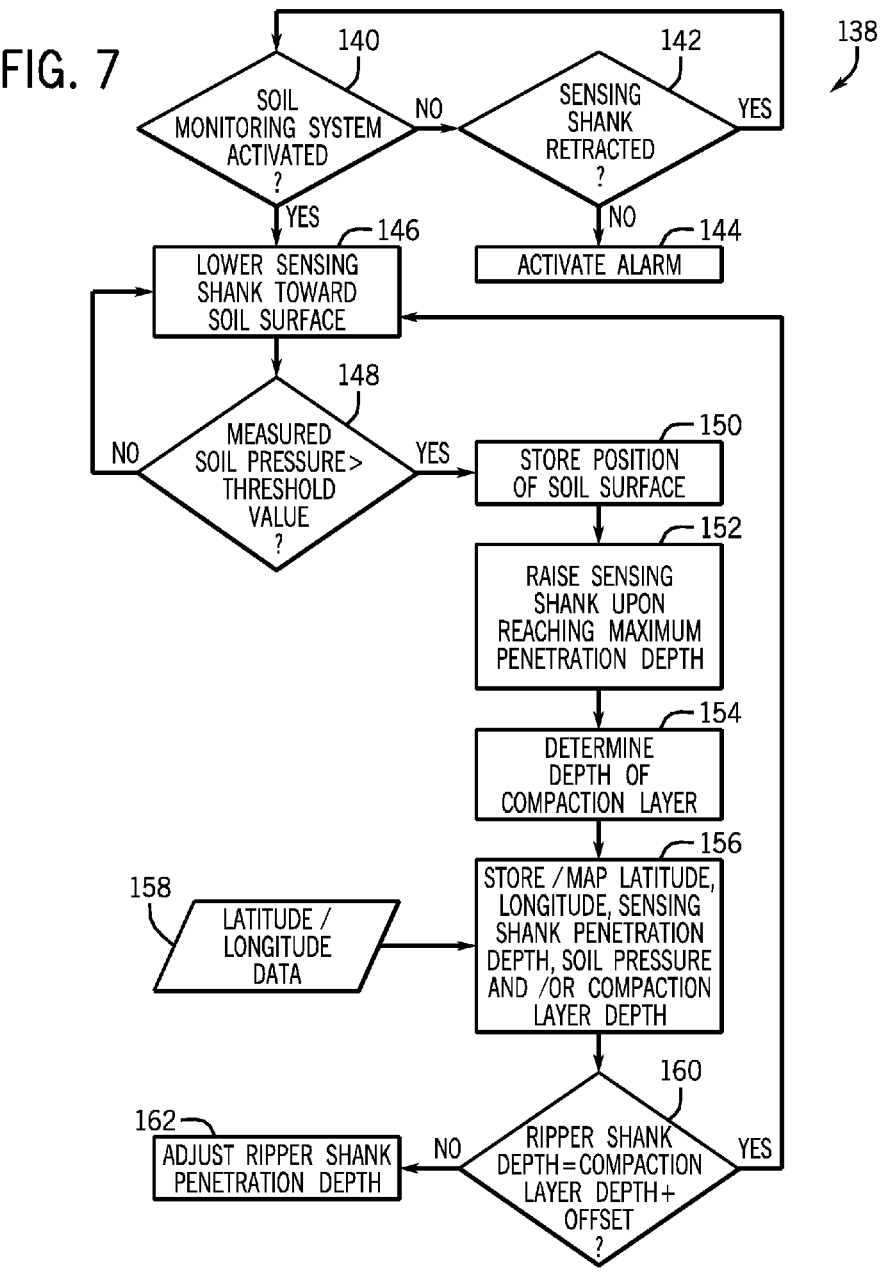

SOIL MONITORING SYSTEM

BACKGROUND

The invention relates generally to ground working equipment, such as agricultural equipment, and more specifically, to a soil monitoring system.

It is well known that to attain the best agricultural performance from a piece of land, a farmer must cultivate the soil, typically through a tilling operation. Common tilling operations include plowing, harrowing, and sub-soiling. Modern farmers perform these tilling operations by pulling a tilling implement behind a motorized tractor. Depending on the crop selection and the soil conditions, a farmer may need to perform several tilling operations at different times over a crop cycle to properly cultivate the land to suit the crop choice. In one type of tilling operation, rows of blades are pulled through soil to break up clods or lumps of soil, as well as old plant material to provide a more amenable soil structure for planting and to level the soil surface.

Other tilling operations are particularly directed toward breaking up subsoil compaction layers. As will be appreciated, soil may become compacted due to the weight of vehicles and/or implements moving across the surface of the field. For example, vehicle and/or implement wheels may compress layers of soil beneath the surface of the field, especially during periods of elevated soil moisture content. Unfortunately, the resulting subsoil compaction layer may block the vertical growth of crop roots through the layer. As a result, the roots may expand horizontally, thereby reducing access to moisture and soil nutrients located beneath the compaction layer, and/or decreasing the resilience of the crops to dry weather conditions. Consequently, a farmer may utilize a tillage implement to break up the compaction layer, thereby enhancing root development.

Before commencing tillage operations, a farmer may manually determine the depth of the compaction layer by taking measurements with a soil penetrometer. As will be appreciated, the depth of the compaction layer may vary throughout a field. To ensure that the compaction layer is effectively dispersed, the farmer may set the penetration depth of the rippers/subsoilers to a level below the maximum measured depth of the compaction layer. Unfortunately, operating the rippers/subsoilers at (or below) the maximum compaction layer depth may generate a large draft force on the tow vehicle. As a result, the tow vehicle may use a significant quantity of fuel to pull the implement through the field, thereby increasing the costs associated with tillage operations.

BRIEF DESCRIPTION

In one embodiment, a soil monitoring system includes a sensing shank, and a first sensor coupled to a leading edge of the sensing shank. The first sensor is configured to output first signals indicative of a pressure exerted on the first sensor by soil as the sensing shank is driven through the soil along a direction of travel. The soil monitoring system also includes a frame forming a channel oriented in a substantially vertical direction relative to a surface of the soil, and a carrier coupled to the sensing shank and disposed within the channel. In addition, the soil monitoring system includes multiple roller bearings coupled to the carrier and configured to engage an inner surface of the channel. The soil monitoring system further includes an actuator extending between the frame and the carrier. The actuator is configured to linearly drive the carrier in a reciprocating motion to vary a penetration depth of the sensing shank within the soil.

In another embodiment, a soil monitoring system includes a sensing shank, and a sensor coupled to a leading edge of the sensing shank. The sensor is configured to output signals indicative of a pressure exerted on the sensor by soil as the sensing shank is driven through the soil along a direction of travel. The soil monitoring system also includes an actuator configured to linearly drive the sensing shank in a reciprocating motion to vary a penetration depth of the sensing shank within the soil. The soil monitoring system further includes a ripper shank positioned behind the sensing shank along the direction of travel. The ripper shank is substantially aligned with the sensing shank in a lateral direction perpendicular to the direction of travel.

In a further embodiment, a soil monitoring system includes a frame, and a sensing shank movably coupled to the frame. The soil monitoring system also includes a sensor coupled to a leading edge of the sensing shank. The sensor is configured to output signals indicative of a pressure exerted on the sensor by soil as the sensing shank is driven through the soil along a direction of travel. In addition, the soil monitoring system includes an actuator configured to linearly drive the sensing shank in a reciprocating motion to vary a penetration depth of the sensing shank within the soil. The soil monitoring system further includes a controller communicatively coupled to the actuator and to the sensor. The controller is configured to instruct the actuator to drive the sensing shank downwardly toward a surface of the soil, to identify a position of the surface of the soil relative to the frame when the pressure exerted on the sensor exceeds a threshold value, and to instruct the actuator to cyclically drive the sensing shank between the surface of the soil and a user-selectable maximum penetration depth.

DRAWINGS

These and other features, aspects, and advantages of the present invention will become better understood when the following detailed description is read with reference to the accompanying drawings in which like characters represent like parts throughout the drawings, wherein:

FIG. 7 is a flow diagram of an exemplary method of operating the soil monitoring system.

DETAILED DESCRIPTION

Figure 1:
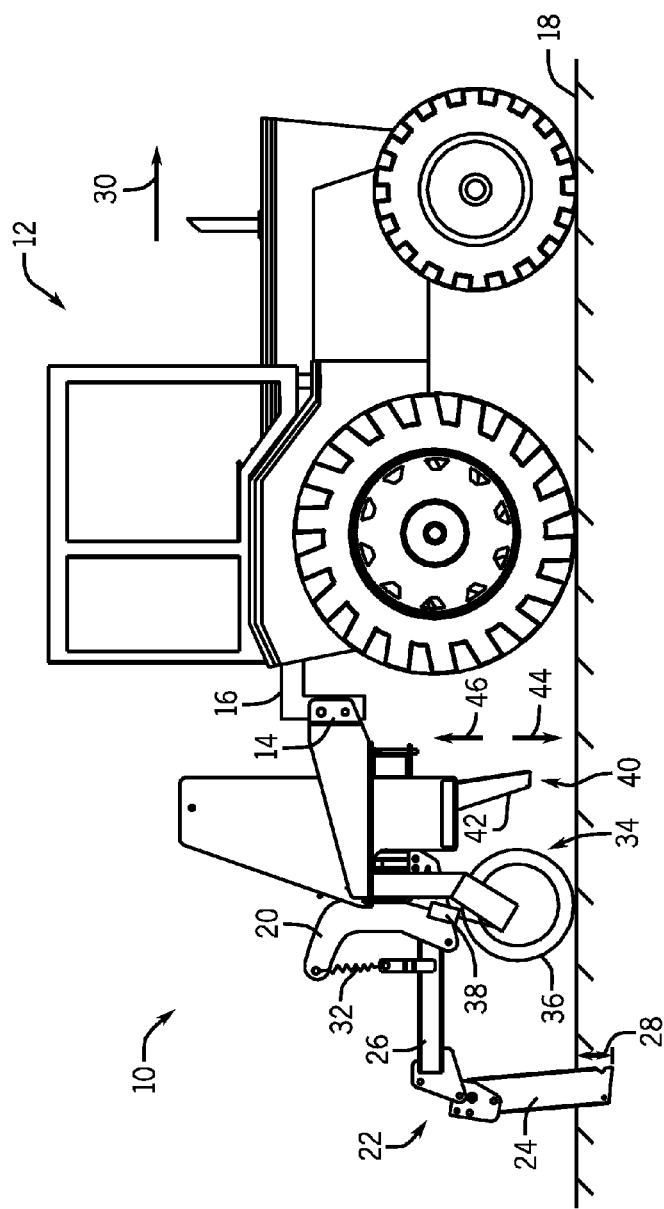
FIG. 1 is a side view of an exemplary agricultural implement system, including a tow vehicle and an agricultural implement.

FIG. 1 is a side view of an exemplary agricultural implement system, including a tow vehicle and an agricultural implement 10. The implement 10 is designed to be towed behind a work vehicle, such as the illustrated tractor 12. In the illustrated embodiment, the implement 10 includes a hitch 14 configured to attach to an appropriate tractor hitch assembly 16. As discussed in detail below, the tractor hitch assembly 16 may be adjustable to enable an operator and/or an automated system to vary a height of the implement 10 relative to the soil surface 18. As illustrated, the hitch 14 is coupled to an implement frame 20 configured to support multiple ground engaging tools, such as the illustrated subsoiler shank assembly 22. In the illustrated embodiment, the subsoiler shank assembly 22 includes a ripper shank 24 and a support arm 26. The ripper shank 24 is configured to engage the soil at a desired penetration depth 28. For example, a lower extent of the ripper shank may be positioned below a subsoil compaction layer. In this configuration, the ripper shank 24 fractures the soil as the implement 10 is towed in a direction of travel 30, thereby substantially reducing or eliminating the compaction layer. The ripper shank 24 is supported by the arm 26, which is rotatably coupled to the frame 20. In the illustrated embodiment, a compression spring 32 extends between the frame 20 and the arm 26. The spring 32 enables the subsoiler shank assembly 22 to retract if the ripper shank 24 encounters an obstruction (e.g., a rock, tree root, etc.), thereby substantially reducing wear on the ripper shank 24.

In certain embodiments, the penetration depth 28 of the ripper shank 24 may be adjusted as the implement is pulled through the field, thereby enabling the ripper shank 24 to effectively engage the compaction layer. In such embodiments, the trailer hitch 16 may adjust a vertical position of the frame 20 relative to the tractor 12 to vary the penetration depth 28 of the ripper shank 24. In addition, as the height of the frame 20 above the soil surface 18 varies, a wheel assembly 34 may adjust a vertical position of a gauge wheel 36 relative to the frame 20, thereby enabling the wheel assembly 34 to support the frame 20 throughout the range of vertical frame movement. For example, in the illustrated embodiment, the wheel assembly 34 includes an actuator 38 configured to adjust the vertical position of the gauge wheel 36 relative to the frame 20. As will be appreciated, the actuator 38 may be a linear actuator, such as a hydraulic cylinder, a pneumatic cylinder, or an electromechanical actuator, or a rotary actuator, such as a hydraulic servo, or an electric servo.

In the illustrated embodiment, the implement 10 includes a soil monitoring system 40 configured to measure soil fracture pressure as a function of penetration depth. As illustrated, the soil monitoring system 40 includes a sensing shank 42 having a sensor configured to output signals indicative of a pressure exerted on the sensor by soil as the sensing shank 42 is driven through the soil along the direction of travel 30. In addition, the soil monitoring system 40 includes an actuator configured to linearly drive the sensing shank 42 in a reciprocating motion to vary a penetration depth of the sensing shank 42 within the soil. For example, the sensing shank 42 may be cyclically driven downwardly in the direction 44, and then upwardly in the direction 46, thereby enabling the sensor to measure soil fracture pressure at a variety of depths. In certain embodiments, the implement 10 may include a spatial locating device configured to monitor the latitude and longitude of the sensing shank 42 as the implement 10 traverses a field. In such embodiments, the soil monitoring system 40 may be configured to establish a map of soil fracture pressure as a function of penetration depth, latitude and longitude. Such maps may be used to determine whether to perform ripping operations on a field and/or to selected a penetration depth of the ripper shank 24.

In addition, the soil monitoring system 40 may analyze the soil fracture pressure as a function of penetration depth to determine a depth of a compaction layer. As will be appreciated, the compaction layer is characterized by a region of compacted soil that blocks vertical growth of crop roots. The compaction layer may cause the roots to expand horizontally, thereby reducing access to moisture and soil nutrients located beneath the compaction layer, and/or decreasing the resilience of the crops to dry weather conditions. Consequently, once the soil monitoring system 40 determines the depth of the compaction layer, the penetration depth 28 of the ripper shank 24 may be adjusted to fracture the soil within the compaction layer, thereby enhancing root development. In certain embodiments, the penetration depth 28 of the ripper shank 24 may be continuously or periodically adjusted based on the detected compaction layer depth. For example, as the sensing shank 42 oscillates in the directions 44 and 46, a controller may determine the local depth of the compaction layer based on the measured soil fracture pressure. The controller may then adjust the penetration depth 28 of the ripper shank 24 to correspond to the local compaction layer depth. Because the penetration depth 28 of the ripper shank 24 is continuously or periodically adjusted based on the local compaction layer depth, the draft of the implement 10 may be substantially less than implements having fixed depth ripper shanks (e.g., set to the maximum expected compaction layer depth). As a result, the tow vehicle 12 may utilize less fuel to pull the implement 10 through the field, thereby reducing costs associated with ripping operations.

Figure 2:
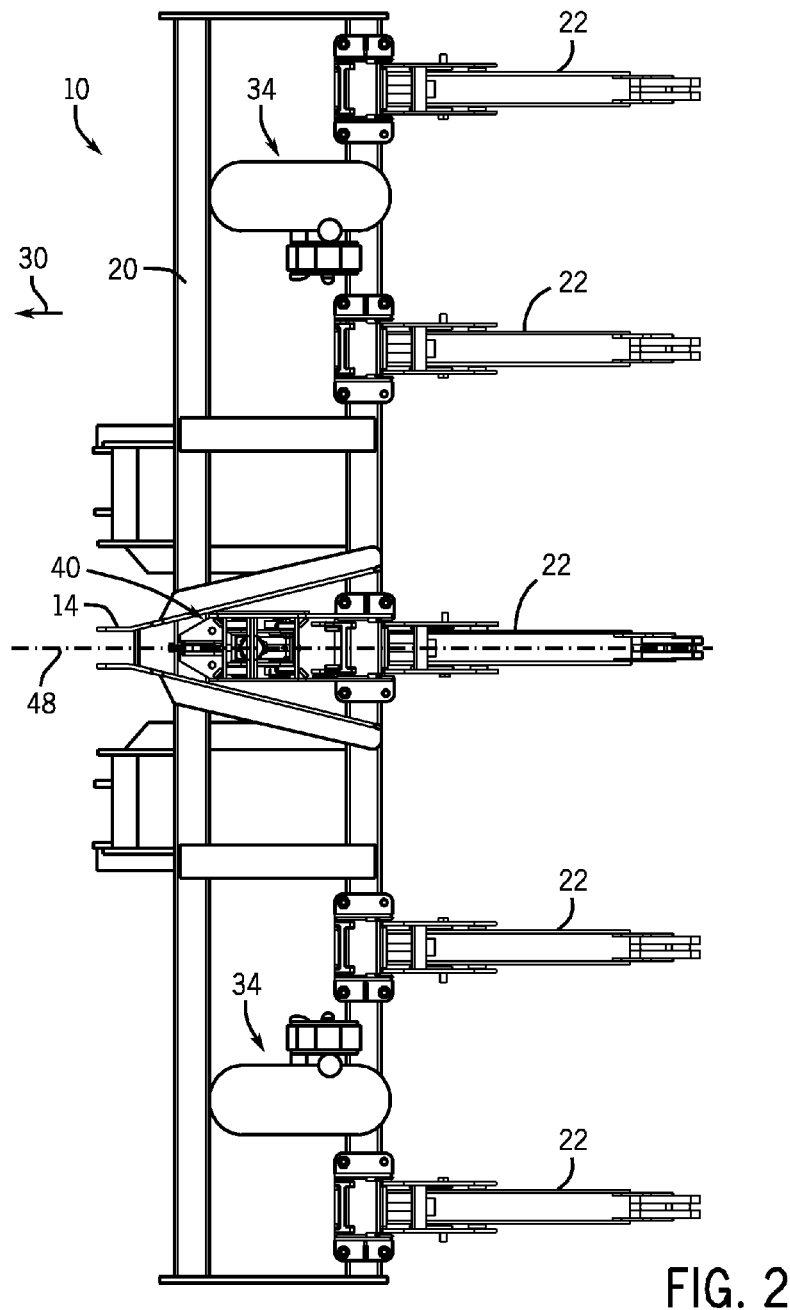
FIG. 2 is a top view of an exemplary agricultural implement that may be employed within the agricultural implement system of FIG. 1.

FIG. 2 is a top view of an exemplary agricultural implement 10 that may be employed within the agricultural implement system of FIG. 1. As illustrated, five subsoiler shank assemblies 22 are coupled to the frame 20. One subsoiler shank assembly 22 is aligned with a centerline 48 of the implement 10, two subsoiler shank assemblies 22 are positioned on a first lateral side of the centerline 48, and two subsoiler shank assemblies 22 are positioned on a second lateral side of the centerline 48, opposite the first lateral side. As will be appreciated, the subsoiler shank assemblies 22 may be laterally positioned to effectively fracture soil along the length of the implement 10. While five subsoiler shank assemblies 22 are employed in the illustrated embodiment, it should be appreciated that alternative embodiments may include more or fewer subsoiler shank assemblies 22. For example, certain implements may include 2, 4, 5, 6, 8, 10, 13, 15, 20, or 25 subsoiler shank assemblies, or more. In addition, while subsoiler shank assemblies 22 are utilized in the illustrated embodiment, it should be appreciated that other tools (e.g., tillage tools, disc blades, moldboard plows, etc.) may be employed in alternative embodiments to fracture soil within the compaction layer.

In the illustrated embodiment, the sensing shank of the soil monitoring system 40 is aligned with the ripper shank of the center subsoiler shank assembly 22 in a lateral direction substantially perpendicular to the direction of travel 30 (e.g., the sensing shank and the center ripper shank are aligned with the centerline 48 of the implement 10). In addition, the ripper shank 24 is positioned behind the sensing shank along the direction of travel 30. Because the sensing shank is substantially aligned with the ripper shank 24, penetration of the sensing shank into the soil does not significantly increase the draft of the implement 10. For example, as the sensing shank moves through the compaction layer in the downward vertical direction 44, contact between the sensing shank and the soil fractures the compaction layer, thereby reducing the force on the ripper shank 24 positioned behind the sensing shank. In addition, while the sensing shank is positioned above the compaction layer, the sensing shank applies a relatively small force to the soil because the sensing shank is passing through substantially uncompacted soil. Accordingly, the sum of the force applied by the sensing shank and the ripper shank positioned behind the sensing shank is not significantly larger than the force applied by the ripper shank alone. Therefore, the draft of the implement 10 is lower than an implement having a sensing shank offset from a corresponding ripper shank. As a result, fuel costs associated with pulling the implement 10 through a field may be reduced.

Once the soil monitoring system 40 determines the depth of the compaction layer, the position of the subsoiler shank assemblies 22 may be adjusted to position each ripper shank below the compaction layer. For example, the trailer hitch 16 may adjust the vertical position of the frame 20 such that the ripper shanks penetrate the soil to a desired depth below the compaction layer. In addition, the position of the wheel assemblies 34 may be adjusted to support the frame 20 at the resultant height above the soil surface. In this manner, the ripper shanks may effectively disperse the compaction layer, thereby enhancing the root development of the crops.

Figure 3:
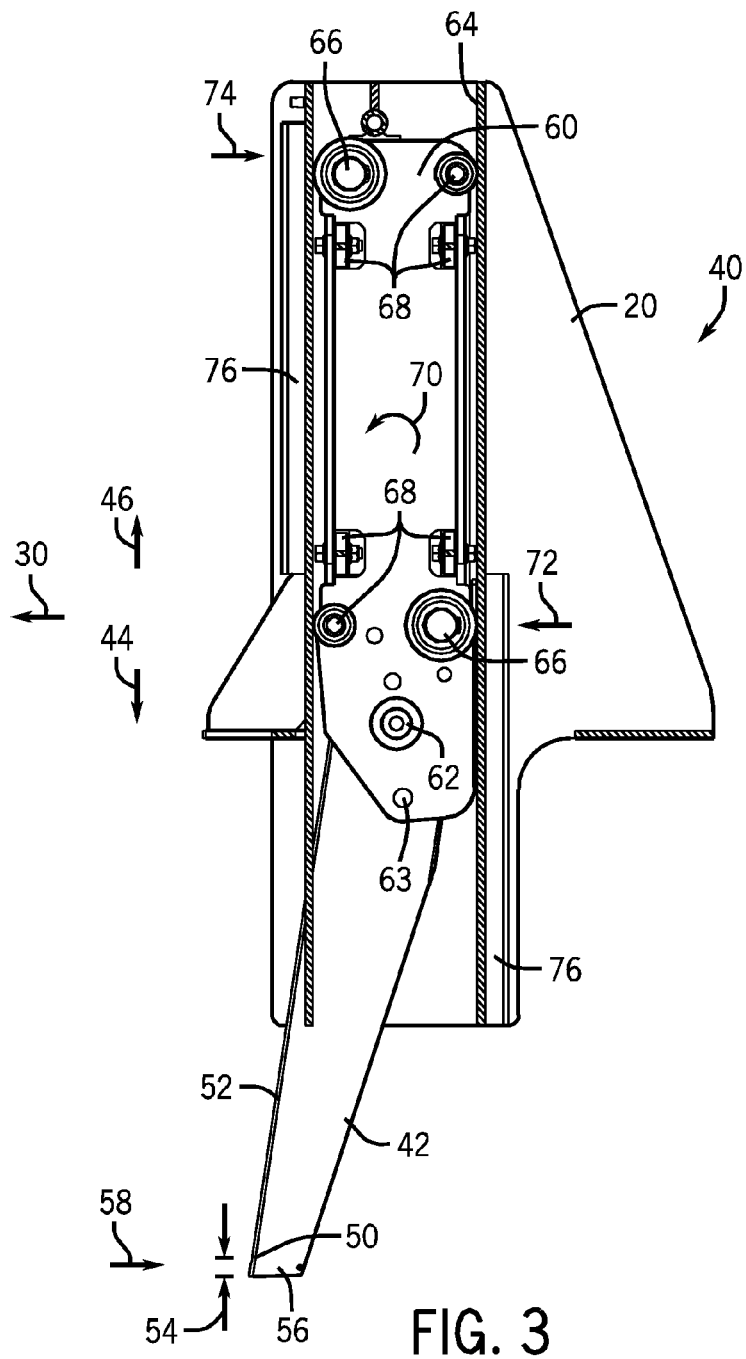
FIG. 3 is a cutaway side view of an embodiment of a soil monitoring system that may be employed within the agricultural implement of FIG. 1.

FIG. 3 is a cutaway side view of an embodiment of a soil monitoring system 40 that may be employed within the agricultural implement of FIG. 1. In the illustrated embodiment, a pressure sensor 50 is coupled to a leading edge 52 of the sensing shank 42. The pressure sensor 50 is configured to output signals indicative of a pressure exerted on the sensor by soil as the sensing shank 42 is driven through the soil along the direction of travel 30. As will be appreciated, the pressure sensor 50 may include a piezoelectric sensor, a mechanical deflection sensor, a fiber optic sensor, a microelectromechanical systems (MEMS) sensor, or any other suitable device configured to output signals based on a measured pressure. In this configuration, the sensor 50 outputs signals indicative of the pressure sufficient to fracture soil incident upon the leading edge 52 of the sensing shank 42 as the sensing shank 42 oscillates through a desired range of penetration depths. While the illustrated sensor 50 is substantially flush with the leading edge 52 of the sensing shank 42, it should be appreciated that alternative embodiments may employ a recessed sensor, or a sensor that protrudes from the leading edge 52 of the sensing shank 42.

In the illustrated embodiment, the pressure sensor 50 is positioned a distance 54 above the bottom edge 56 of the sensing shank 42. For example, the distance 54 may be about 0.5 to about 1.5 inches, about 0.5 to about 1.0 inches, or about 0.75 inches. By positioning the sensor 50 a desired distance 54 above the bottom edge 56 of the sensing shank 42, the sensor 50 may be located above unstable soil flow patterns associated with interaction between the bottom edge 56 of the sensing shank 42 and the surrounding soil. As a result, the accuracy of the soil fracture pressure measurement may be enhanced. In addition, because the leading edge 52 is sloped toward the direction of travel 30 from a top edge of the sensing shank to the bottom edge 56, the sensor 50 contacts substantially undisturbed soil (i.e., soil that has not been fractured by the upper portion of the sensing shank), thereby further increasing the accuracy of the soil fracture pressure measurement. Consequently, the sensor 50 is particularly positioned to facilitate accurate pressure measurements of a contact force 58 between the sensing shank 42 and the soil.

In the illustrated embodiment, the sensing shank 42 is coupled to a carrier 60 by a pivot bolt 62 and a shear pin 63. In this configuration, if the sensing shank 42 encounters an obstruction (e.g., a rock, tree root, etc.), the shear pin 63 may break, thereby enabling the sensing shank 42 to rotate about the pivot bolt 62. Because the sensing shank 42 retracts upon contact with an obstruction, the possibility of excessive wear on the shank 42 and/or the sensor 50 may be substantially reduced or eliminated. After the obstruction is cleared, an operator may replace the shear bolt 63, and continue operation of the soil monitoring system 40. While the illustrated embodiment employs a shear pin 63, it should be appreciated that alternative embodiments may utilize a spring assembly, such as the assembly described above with reference to the subsoiler shank assembly 22, to enable the sensing shank 42 to retract upon contact with an obstruction.

The carrier 60 is configured to direct movement of the sensing shank 42 in the upward direction 46 and the downward direction 44, and to resist the force 58 applied to the sensing shank 42 by the soil. As illustrated, the carrier 60 is disposed within a channel 64 of the frame 20. The channel 64 is configured to limit movement of the carrier 60 to the vertical directions 44 and 46 (e.g., the channel 64 is configured to block lateral and longitudinal movement of the carrier 60). To facilitate movement of the carrier 60 within the channel 64, the carrier 60 includes a first set of roller bearings 66 and a second set of roller bearings 68. The roller bearings 66 and 68 are coupled to the carrier 60, and configured to engage an inner surface of the channel 64, thereby facilitating movement of the carrier 60 in the upward direction 46 and the downward direction 44 as the sensing shank 42 is driven to oscillate.

In the illustrated embodiment, each roller bearing 66 of the first set is configured to rotate about an axis substantially perpendicular to the direction of travel 30. In addition, a diameter of each roller bearing 66 of the first set is larger than a diameter of each roller bearing 68 of the second set. Accordingly, the roller bearings 66 of the first set are configured to resist the forces and moments associated with contact between the sensing shank 42 and the soil. For example, the contact force 58 between the sensing shank 42 and the soil induces the carrier 60 to rotate in the direction 70. However, the rotation is blocked by contact between the roller bearings 66 and the inner surfaces of the channel 64. Therefore, the roller bearings 66 resist a contact force in the direction 72 between the lower roller bearing 66 and the inner surface of the channel 64, and a contact force 74 between the upper roller bearing 66 and the inner surface of the channel 64. In addition, the frame 20 includes supports 76 positioned outside of the channel 64 along the path of the roller bearings 66 to provide the frame 20 with additional support against the forces 72 and 74. In this configuration, the roller bearings 66 and 68, and the frame supports 76 enable the sensing shank 42 to move smoothly in the vertical directions 44 and 46, thereby facilitating measurement of soil fracture pressure at a variety of penetration depths.

Figure 4:
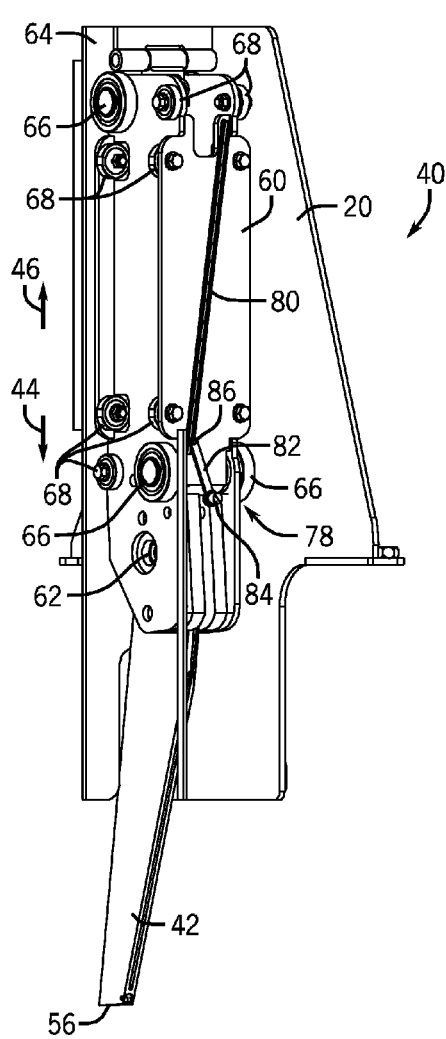
FIG. 4 is a cutaway perspective view of the soil monitoring system, as shown in FIG. 3, having a sensing shank in a retracted position.

FIG. 4 is a cutaway perspective view of the soil monitoring system 40, as shown in FIG. 3, in which the sensing shank 42 is in a retracted position. In the illustrated embodiment, the soil monitoring system 40 includes a position sensor 78 coupled to the channel 64, and configured to output signals indicative of a position of the sensing shank 42 relative to the frame 20. As discussed in detail below, a controller receives the signals from the position sensor 78 and the soil pressure sensor 50, and determines the depth of the compaction layer, and/or generates a map of soil fracture pressure as a function of penetration depth, based on the signals. In the illustrated embodiment, the shank position sensor 78 includes an angled guide 80 coupled to the carrier 60, and a pin 82. The pin 82 has a first end 84 configured to couple to a potentiometer, and a second end 86 engaged with the angled guide 80. In this configuration, movement of the carrier 60 in the vertical direction drives the pin 82 to rotate the potentiometer, which in turn, outputs signals indicative of the sensing shank position. In certain embodiments, the second end 86 of the pin 82 is disposed within a groove of the angled guide 80 such that movement of the carrier 60 drives the pin 82 to rotate.

Figure 5:
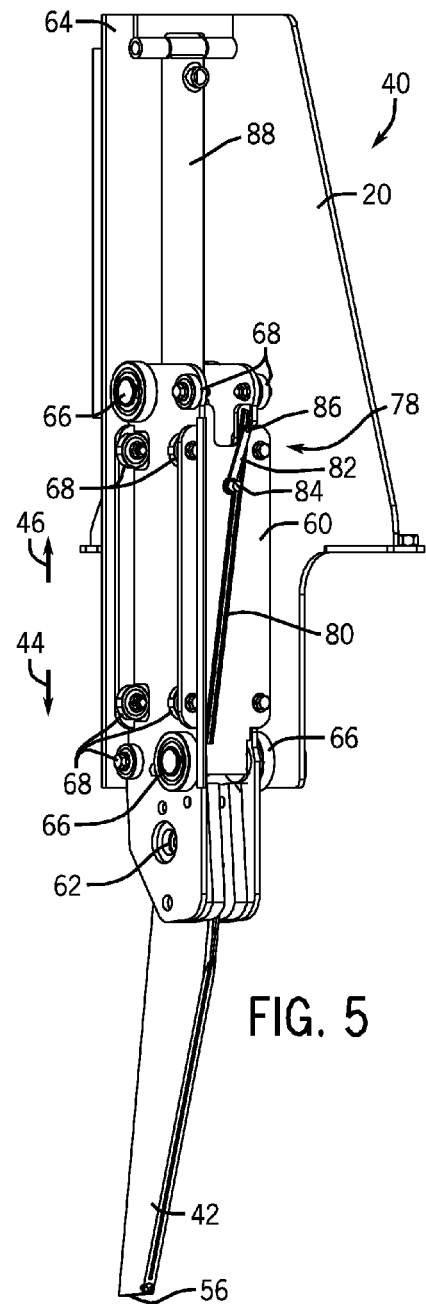
FIG. 5 is a cutaway perspective view of the soil monitoring system, as shown in FIG. 3, in which the sensing shank is in an extended position.

FIG. 5 is a cutaway perspective view of the soil monitoring system, as shown in FIG. 3, in which the sensing shank 42 is in an extended position. As illustrated, the pin 82 is rotated from the position shown in FIG. 4. Accordingly, the potentiometer coupled to the pin 82 outputs signals indicative of the extended position of the sensing shank 42. In the illustrated embodiment, an actuating cylinder 88 extending between the frame 20 and the carrier 60 is configured to linearly drive the carrier 60 in a reciprocating motion to vary the penetration depth of the sensing shank 42 within the soil. As discussed in detail below, the actuating cylinder 88 may be driven by a pressurized fluid (e.g., a pneumatic system, or a hydraulic system). In certain embodiments, the actuating cylinder 88 is configured to drive the sensing shank 42 from a position above the soil surface to a penetration depth of about 16 inches, about 18 inches, about 20 inches, about 22 inches, or more, thereby enabling the pressure sensor to measure soil fracture pressure throughout a desired range of soil depths.

While the carrier 60 is configured to move within the channel 64 in the illustrated embodiment, it should be appreciated that alternative embodiments may employ a four bar linkage to control movement of the carrier 60. For example, in certain embodiments, a first bar may extend between the frame and a top portion of the carrier, and a second bar may extend between the frame and a bottom portion of the carrier. In such embodiments, the bars may limit movement of the carrier 60 to the upward and downward directions. The bars may also resist the force applied to the sensing shank via contact with the soil, thereby supporting the sensing shank during operation of the soil monitoring system. Similar to the carrier/channel configuration described above, an actuator (e.g., mounted to the frame) may drive the carrier to oscillate.

Figure 6:
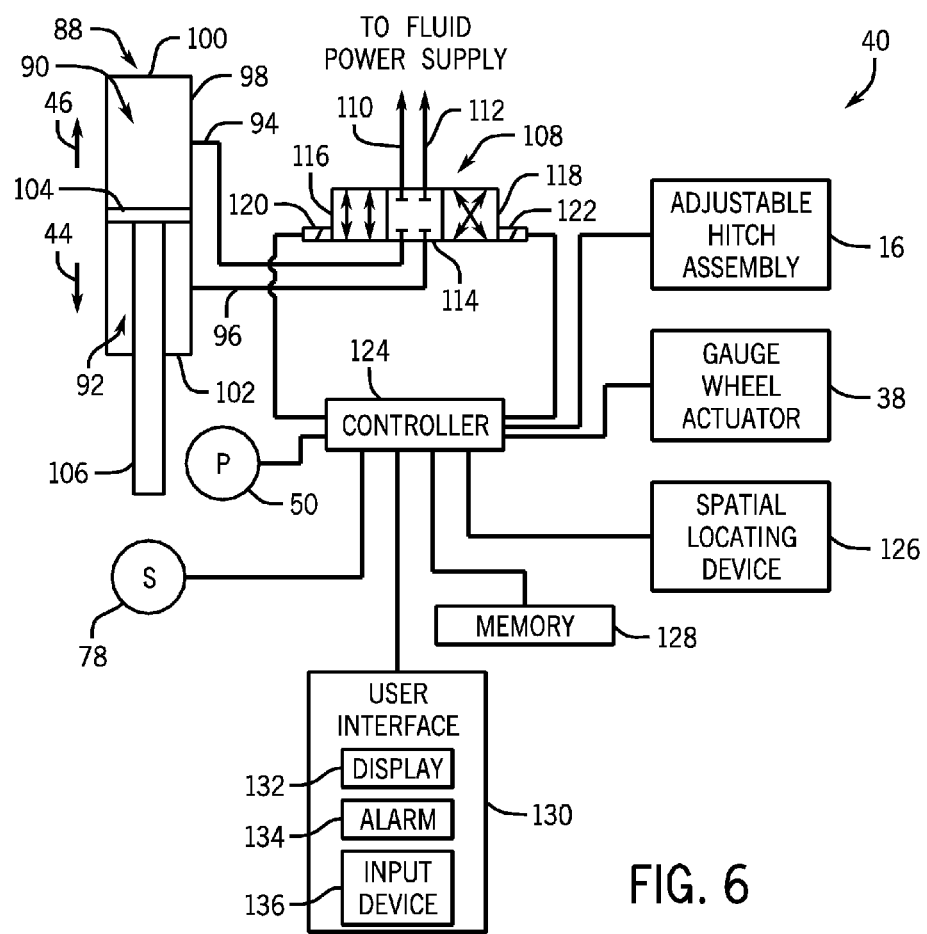
FIG. 6 is a schematic diagram of an embodiment of the soil monitoring system.

FIG. 6 is a schematic diagram of an embodiment of the soil monitoring system 40. In the illustrated embodiment, the soil monitoring system 40 includes the actuating cylinder 88, which extends between the frame and the carrier. As illustrated, the actuating cylinder includes a cap side 90 and a rod side 92. A first fluid conduit 94 is coupled to the cap side 90, and a second fluid conduit 96 is coupled to the rod side 92. Consequently, applying fluid pressure to the first conduit 94 induces the actuating cylinder 88 to extend in the direction 44. Similarly, applying fluid pressure to the second conduit 94 induces the actuating cylinder 88 to retract in the direction 46. It should be appreciated that in alternative embodiments, the actuating cylinder 88 may be reversed such that the first fluid conduit 94 is coupled to the rod side 92, and the second fluid conduit 96 is coupled to the cap side 90. In such embodiments, applying fluid pressure to the first fluid conduit 94 induces the actuating cylinder 88 to retract in the direction 46, and applying fluid pressure to the second conduit 96 induces the actuating cylinder 88 to extend in the direction 44.

As illustrated, the actuating cylinder 88 includes a barrel 98 having an end cap 100, a gland 102, and a piston 104. As will be appreciated, the cap side 90 is defined by a volume formed from the piston 104, barrel 98 and end cap 100, while the rod side 92 is defined by a volume formed from the piston 104, barrel 98 and gland 102. Furthermore, a rod 106 is coupled to the piston 104 such that movement of the piston 104 drives the rod 106 to translate in the direction 44 and/or 46. As will be further appreciated, various seals may be employed between the rod 106 and the gland 102 to block a flow of fluid from exiting the cylinder 88. In addition, the piston 104 includes additional seals to block a flow of fluid between the cap side 90 and the rod side 92 of the cylinder 88. In the illustrated embodiment, applying fluid pressure to the first conduit 94 increases pressure to the cap side 90 of the actuating cylinder 88, thereby driving the piston 104 and the rod 106 in the direction 44. Conversely, applying fluid pressure to the second conduit 96 increases pressure to the rod side 92 of the actuating cylinder 88, thereby driving the piston 104 and the rod 106 in the direction 46. It should be appreciated that increasing pressure to one conduit may be accompanied by a decrease in pressure to the other conduit to facilitate movement of the piston 104 within the barrel 98. It should further be appreciated that the actuating cylinder 88 may be particularly configured to operate based on pneumatic or hydraulic fluid pressure.

As illustrated, the first conduit 94 and the second conduit 96 are coupled to a depth control valve 108 (e.g., directional control valve). The depth control valve 108 is configured to control fluid flow from a fluid power supply to the actuating cylinder 88. In the illustrated embodiment, the directional control valve 108 is a three-position/four-way hydraulic valve configured to control a flow of hydraulic fluid to the cylinder 88. However, it should be appreciated that a pneumatic directional control valve may be employed in embodiments utilizing a pneumatic cylinder. As illustrated, a supply conduit 110 and a return conduit 112 are coupled to the depth control valve 108. The supply conduit 110 is configured to provide fluid to the cylinder 88, while the return conduit 112 enables fluid to return to the fluid power supply. In certain embodiments, the fluid power supply may be coupled to the tow vehicle 12.

In the illustrated embodiment, the depth control valve 108 includes a first position 114 configured to block fluid flow from the supply and return conduits 110 and 112 to the first and second conduits 94 and 96. While the depth control valve 108 is in the first position 114, fluid pressure within the cap side 90 and the rod side 92 of the cylinder 88 is maintained, thereby holding the sensing shank in a desired position. The depth control valve 108 also includes a second position 116 that establishes a fluid connection between the supply conduit 110 and the first conduit 94, and between the return conduit 112 and the second conduit 96. While the depth control valve 108 is in the second position 116, fluid flows from the supply conduit 110 to the cap side 90 of the actuating cylinder 88, and from the rod side 92 of the actuating cylinder 88 to the return conduit 112, thereby inducing the piston rod 106 to extend in the direction 44. Consequently, transitioning the depth control valve 108 to the second position 116 drives the sensing shank downwardly, thereby increasing the penetration depth of the pressure sensor. Furthermore, the depth control valve 108 includes a third position 118 that establishes a fluid connection between the supply conduit 110 and the second conduit 96, and between the return conduit 112 and the first conduit 94. While the depth control valve 108 is in the third position 118, fluid flows from the supply conduit 110 to the rod side 92 of the actuating cylinder 88, and from the cap side 90 of the actuating cylinder 88 to the return conduit 112, thereby inducing the piston rod 106 to retract in the direction 46. Consequently, transitioning the depth control valve 108 to the third position 118 drives the sensing shank upwardly, thereby decreasing the penetration depth of the pressure sensor.

As illustrated, the depth control valve 108 includes two actuators 120 and 122 configured to adjust the position of the valve 108. In the illustrated embodiment, the first actuator 120 is a solenoid configured to drive the depth control valve 108 to the second position 116, and the second actuator 122 is a solenoid configured to drive the valve 108 to the third position 118. Both the first and second actuators 120 and 122 are communicatively coupled to a controller 124 configured to adjust the position of the depth control valve 108. Consequently, the controller 124 may vary the penetration depth of the sensing shank by adjusting the position of the depth control valve 108. For example, the controller 124 may increase the penetration depth of the sensing shank by driving the depth control valve 108 to the second position 116 via the first actuator 120. The controller 124 may also decrease the penetration depth of the sensing shank by driving the depth control valve 108 to the third position 118 via the second actuator 122. In this manner, the controller 124 may drive the sensing shank to move in a reciprocating motion between the surface of the soil and a maximum penetration depth, thereby enabling the pressure sensor to measure soil fracture pressure throughout a range of depths.

In the illustrated embodiment, the controller 124 is also communicatively coupled to the soil pressure sensor 50, and to the shank position sensor 78. Accordingly, the controller 124 is configured to monitor soil fracture pressure as a function of penetration depth as the sensing shank is driven in a reciprocating motion by the actuating cylinder 88. In addition, the controller 124 is communicatively coupled to a spatial locating device 126 (e.g., global positioning system (GPS) receiver) configured to output signals indicative of a latitude and a longitude of the sensing shank 42. In certain embodiments, the controller 124 is configured to establish a map of soil fracture pressure as a function of penetration depth, latitude and longitude. Furthermore, as discussed in detail below, the controller 124 may be configured to determine a depth of a compaction layer based on the measured soil fracture pressure. In such embodiments, the controller 124 may establish a map of compaction layer depth as a function of latitude and longitude. The soil fracture pressure map and/or the compaction layer map may be used by farmers to identify regions of the field having undesirable soil compaction, and/or to compare crop yields to corresponding soil fracture pressures.

In the illustrated embodiment, a memory 128 is communicatively coupled to the controller 124. The memory 128 is configured to store soil fracture pressure data and/or compaction layer data output by the controller 124. Accordingly, the soil fracture pressure data and/or the compaction layer data may be analyzed after the implement 10 has traversed a field, thereby enabling a farmer to determine whether to perform subsequent ripping operations on the field, and/or to determine whether subsequent ripping operations should be performed on a particular area of the field. Furthermore, the controller 124 is communicatively coupled to a user interface 130 having a display 132. Accordingly, the compaction layer map (e.g., compaction layer depth as a function of latitude and longitude) and/or the soil fracture pressure map (e.g., soil fracture pressure as a function of penetration depth, latitude and longitude) may be presented on the display 132, thereby enabling an operator to view the data as the measurements are recorded. In addition, an operator may display maps corresponding to previously recorded soil measurements (e.g., maps stored in the memory 128). In this manner, the operator may determine the effectiveness of previous ripping operations, whether ripping operations should be performed on a particular area of the field, and/or the proper penetration depth for the ripper shank. In certain embodiments, the soil monitoring system may also measure the draft force of the implement 10 (e.g., via a load cell positioned between the tractor and the implement). In such embodiments, the draft force data may be associated with the latitude and longitude, and stored within the memory 128 and/or presented on the display 132.

In the illustrated embodiment, the controller 124 is also communicatively coupled to the adjustable hitch assembly 16, and to the gauge wheel actuator 38. Accordingly, the controller 124 may continuously or periodically adjust the position of the frame 20 relative to the soil surface, and/or the position of the gauge wheels 36 relative to the frame 20 to vary the penetration depth of the ripper shanks. By way of example, if the soil monitoring system 40 determines that the local compaction layer is about 8 inches below the surface of the soil, the controller 124 may automatically adjust the position of the frame 20 and/or the position of the gauge wheels 36 to place the ripper shanks at a desired depth below the compaction layer to properly fracture the soil. Because the depth of the ripper shank is continuously or periodically adjusted while the implement is in operation, the draft of the implement may be substantially less than implements having fixed depth ripper shanks (e.g., set to the maximum expected compaction layer depth). As a result, the tow vehicle may use less fuel to pull the implement through the field, thereby reducing the costs associated with ripping operations.

In the illustrated embodiment, the user interface 130 includes an alarm 134 configured to activate if the soil monitoring system is disengaged and the sensing shank is not in a retracted position. If the alarm 134 is activated, the operator may manually retract the sensing shank to reduce wear while the soil monitoring system is not in operation. In addition, the user interface 130 includes an input device 136 configured to control operation of the soil monitoring system. In certain embodiments, an operator may input a desired offset distance between the compaction layer and a bottom edge of the ripper shank into the input device 136. For example, the input device 136 may include a numeric keypad configured to receive an offset distance in inches. Once the controller 124 receives the desired offset distance, the controller 124 will adjust the penetration depth of the ripper shanks to the appropriate depth. By way of example, if the soil monitoring system determines that the compaction layer is about 8 inches below the surface of the soil, and an offset distance of 3 inches in entered into the input device 136, the controller 124 will adjust the penetration depth of the ripper shanks to about 11 inches. As will be appreciated, the offset distance may be particularly selected to accommodate local variations in the depth of the compaction layer, thereby enhancing soil conditions, facilitating improved crop development, and/or improving crop resistance to reduced moisture. While the offset distance may be manually input in the illustrated embodiment, it should be appreciated that in alternative embodiments, the offset distance may be automatically computed based on soil conditions, such as moisture or density.

In certain embodiments, the controller 124 is configured to update the position of the soil surface with each oscillation of the sensing shank, thereby facilitating accurate penetration depth measurements. For example, the controller 124 may instruct the depth control valve 108 to lower the sensing shank toward the soil surface. When the soil pressure sensor 50 detects a fracture pressure that exceeds a threshold value, the controller 124 associates the position of the sensing shank with the soil surface. Consequently, further downward movement of the sensing shank is associated with soil penetration. In addition, once the sensing shank has reached a maximum desired penetration depth, the controller 124 instructs the depth control valve 108 to raise the sensing shank upwardly to a desired distance above the soil surface, where the process repeats. By cyclically updating the position of the soil surface, the soil monitoring system may accurately determine the depth of the compaction layer, and/or establish accurate maps of soil fracture pressure as a function of penetration depth. In certain embodiments, the controller 124 is configured to set the soil fracture pressure measurement to zero (i.e., nullify/zero the sensor 50) while the soil pressure sensor 50 is positioned above the soil surface. In this manner, the controller 124 may compensate for temperature dependent variations in the sensor measurements, thereby enhancing the accuracy of the measured soil fracture pressure.

FIG. 7 is a flow diagram of an exemplary method 138 of operating the soil monitoring system. First, as represented by block 140, the operational state of the soil monitoring system is determined. If the soil monitoring system is not activated, the method proceeds to block 142, in which the position of the sensing shank in determined. If the sensing shank is not retracted, an alarm is activated, as represented by block 144. By way of example, if the soil monitoring system is not activated and the shank position sensor indicates that the sensing shank is not retracted, the alarm is activated to alert an operator that movement of the implement may cause the sensing shank to unnecessarily engage the soil, thereby increasing wear on the sensing shank. Accordingly, if the alarm is activated, the operator may manually retract the sensing shank to reduce wear. In certain embodiments, the soil monitoring system may include a locking mechanism configured to hold the sensing shank in the retracted position when the monitoring system is deactivated, thereby reducing the load on the actuating cylinder.

If the soil monitoring system is activated, the sensing shank is lowered toward the soil surface while the implement traverses the field, as represented by block 146. When the measured soil pressure exceeds a threshold value, as represented by block 148, the position of the sensing shank is stored, as represented by block 150. In the present embodiment, the threshold value is selected to correspond to an expected minimum soil fracture pressure. Accordingly, a measured soil pressure greater than the threshold value is indicative of soil penetration, and the corresponding stored sensing shank position represents the position of the soil surface. The sensing shank continues to move in the downward direction until a maximum desired penetration depth is reached. The sensing shank is then raised in an upwardly direction, as represented by block 152. This process repeats while the soil monitoring system is activated, thereby enabling the pressure sensor to measure soil fracture pressure throughout a desired range of penetration depths. By updating the position of the soil surface each time the sensing shank is lowered into the soil, an accurate map of soil fracture pressure as a function of penetration depth may be established.

As the sensing shank oscillates, the pressure sensor measures soil fracture pressure throughout the range of penetration depths. By analyzing the soil fracture pressure as a function of penetration depth, a compaction layer depth is determined, as represented by block 154. For example, the compaction layer may correspond to a local maxima of soil fracture pressure as a function of penetration depth. Next, the latitude, longitude, sensing shank penetration depth, soil fracture pressure and/or compaction layer depth is stored and/or mapped, as represented by block 156. For example, latitude and longitude data 158 may be received from a spatial locating device, and used to establish a map of compaction layer depth across a field. In addition, a three-dimensional map may be generated of the soil fracture pressure as a function of penetration depth, latitude and longitude. Such maps may be used to determine whether to perform ripping operations on a field, and/or to select a penetration depth of a fixed depth ripper shank.

In certain embodiments, a penetration depth of the ripper shank may be continuously or periodically adjusted based on the depth of the compaction layer. For example, the ripper shank may be positioned below the compaction layer by a desired offset to fracture the soil of the compaction layer. Accordingly, if a depth of the ripper shank is not equal to the depth of the compaction layer plus the offset, as represented by block 160, the depth of the ripper shank is adjusted, as represented by block 162. In this manner, the depth of the ripper shank may be maintained at the desired offset below the compaction layer as the implement traverses the field. By way of example, if the soil monitoring system determines that the depth of the compaction layer is 4 inches below the soil surface and the offset is 2 inches, the ripper shank may be adjusted to a depth of about 6 inches to fracture the soil, thereby substantially reducing or eliminating the compaction layer. As the soil monitoring system detects variations in the compaction layer depth, the ripper shank is adjusted to compensate, thereby reducing soil compaction throughout the field. Because the depth of the ripper shank is continuously or periodically adjusted while the implement is in operation, the draft of the implement may be substantially less than implements having fixed depth ripper shanks (e.g., set to the maximum expected compaction layer depth plus the offset). As a result, the tow vehicle may use less fuel to pull the implement through the field, thereby reducing the costs associated with ripping operations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A soil monitoring system, comprising:
   a sensing shank;
   a first sensor coupled to a leading edge of the sensing shank, wherein the first sensor is configured to output first signals indicative of a pressure exerted on the first sensor by soil as the sensing shank is driven through the soil along a direction of travel;
   a frame forming a channel oriented in a substantially vertical direction relative to a surface of the soil;
   a carrier coupled to the sensing shank and disposed within the channel;
   a plurality of roller bearings coupled to the carrier and configured to engage an inner surface of the channel; and
   an actuator extending between the frame and the carrier, wherein the actuator is configured to linearly drive the carrier in a reciprocating motion to vary a penetration depth of the sensing shank within the soil.

2. The soil monitoring system of claim 1, comprising a second sensor coupled to the channel, and configured to output second signals indicative of a position of the sensing shank relative to the frame.

3. The soil monitoring system of claim 2, comprising a controller communicatively coupled to the first sensor, to the second sensor, and to the actuator, wherein the controller is configured to determine a position of the surface of the soil relative to the frame, and the penetration depth of the sensing shank beneath the surface of the soil, based on the first and second signals.

4. The soil monitoring system of claim 3, wherein the controller is configured to instruct the actuator to cyclically drive the sensing shank between a position above the surface of the soil and a user-selectable maximum penetration depth.

5. The soil monitoring system of claim 3, comprising a spatial locating device communicatively coupled to the controller, wherein the spatial locating device is configured to output third signals indicative of a latitude and a longitude of the sensing shank, and the controller is configured to output fourth signals indicative of the latitude, the longitude, the penetration depth, the pressure exerted on the sensor, or a combination thereof, at a desired frequency.

6. The soil monitoring system of claim 1, comprising a ripper shank mounted to the frame, and positioned behind the sensing shank along the direction of travel, wherein the ripper shank is substantially aligned with the sensing shank in a lateral direction perpendicular to the direction of travel.

7. The soil monitoring system of claim 6, comprising a controller configured to determine a depth of a compaction layer based on the first signals, and to adjust a penetration depth of the ripper shank based on the depth of the compaction layer.

8. The soil monitoring system of claim 1, wherein the plurality of roller bearings comprises a first set of roller bearings having a first diameter, and a second set of roller bearings having a second diameter, wherein the first diameter is larger than the second diameter, and an axis of rotation of each roller bearing of the first set is substantially perpendicular to the direction of travel.

9. The soil monitoring system of claim 1, wherein the actuator comprises a hydraulic cylinder.

10. The soil monitoring system of claim 1, comprising an alarm configured to activate if the carrier is not in a retracted position when the soil monitoring system is not in operation.

11. A soil monitoring system, comprising:
a frame;
a sensing shank movably coupled to the frame;
a sensor coupled to a leading edge of the sensing shank, wherein the sensor is configured to output signals indicative of a pressure exerted on the sensor by soil as the sensing shank is driven through the soil along a direction of travel;
an actuator configured to linearly drive the sensing shank in a reciprocating motion to vary a penetration depth of the sensing shank within the soil; and a controller communicatively coupled to the actuator and to the sensor, wherein the controller is configured to instruct the actuator to drive the sensing shank downwardly toward a surface of the soil, to identify a position of the surface of the soil relative to the frame when the pressure exerted on the sensor exceeds a threshold value, and to instruct the actuator to drive the sensing shank upwardly when the sensing shank reaches a user-selectable maximum penetration depth.

12. The soil monitoring system of claim 11, comprising a ripper shank, wherein the controller is configured to determine a depth of a compaction layer based on the signals, and to adjust a penetration depth of the ripper shank based on the depth of the compaction layer.

13. The soil monitoring system of claim 12, wherein the controller is configured to instruct a trailer hitch to adjust a vertical position of the frame relative to the surface of the soil, to instruct a gauge wheel actuator to adjust a vertical position of a gauge wheel relative to the frame, or a combination thereof, to adjust the penetration depth of the ripper shank.

14. The soil monitoring system of claim 11, comprising a ripper shank mounted to the frame, and positioned behind the sensing shank along the direction of travel, wherein the ripper shank is substantially aligned with the sensing shank in a lateral direction perpendicular to the direction of travel.

15. The soil monitoring system of claim 11, comprising:
a channel within the frame, wherein the channel is oriented in a substantially vertical direction relative to the surface of the soil;
a carrier coupled to the sensing shank and disposed within the channel; and
a plurality of roller bearings coupled to the carrier, and configured to engage an inner surface of the channel;
wherein the actuator extends between the frame and the carrier.

* * * * *